Figure 1:
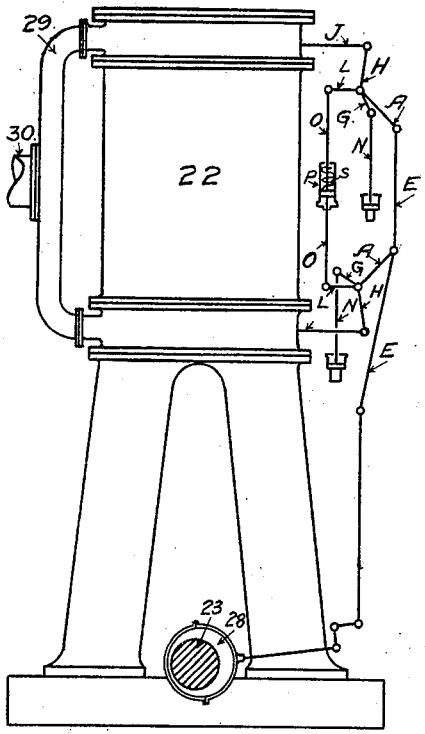

No. 674,410. Patented May 21, 1901.
A. H. HELANDER.
GAS COMPRESSING ENGINE.
(Application filed Jan. 28, 1900.)

(No Model.) 4 Sheets—Sheet 1.

WITNESSES:
L. K. Lachman
R. H. Miller

INVENTOR:
Axel H. Helander
by Frank C. Roberts
attorney

No. 674,410. Patented May 21, 1901.
A. H. HELANDER.
GAS COMPRESSING ENGINE.
(Application filed Jan. 23, 1900.)
(No Model.) 4 Sheets—Sheet 3.

WITNESSES:
L. K. Lachman
R. H. Miller

INVENTOR:
Axel H. Helander
by Frank C. Roberts
Attorney.

UNITED STATES PATENT OFFICE.

AXEL H. HELANDER, OF PHILADELPHIA, PENNSYLVANIA.

GAS-COMPRESSING ENGINE.

SPECIFICATION forming part of Letters Patent No. 674,410, dated May 21, 1901.

Application filed January 23, 1900. Serial No. 2,558. (No model.)

*To all whom it may concern:*

Be it known that I, AXEL H. HELANDER, a citizen of the United States, residing in the city of Philadelphia, county of Philadelphia, in the State of Pennsylvania, have invented certain new and useful Improvements in Gas-Compressing Engines, of which the following, taken in connection with the accompanying drawings, is a full and clear specification.

My invention relates to improvements in the gear for operating the air-inlet and the air-outlet valves of engines for compressing air or other gases.

As ordinarily constructed, an air-compressing engine consists of a steam-engine connected to a piston operating within an air-cylinder, the ends of which are alternately open and closed to the atmosphere and to the receptacle for receiving the compressed air, the opening to the atmosphere being controlled by air-inlet valves and the opening to the receptacle being controlled by air-outlet valves.

In the case of engines for compressing gases other than air the source of supply of the gas to be compressed takes the place of the atmosphere in the above description.

In the accompanying drawings the steam-cylinder is omitted and the only cylinder shown is the air-cylinder.

In the operation of an air-compressing engine it is desirable to arrange the air-outlet valves so that they will open when the air being compressed within the cylinder equals in pressure that existing within the chamber or receptacle into which the air is to be discharged. This is desirable for the following reasons: (*a*) If the air within the cylinder were compressed to a higher pressure than that in the receiving-chamber, there would evidently be a waste of power. (*b*) If the air-outlet valve were opened before the pressure in the air-cylinder equaled that in the receiving-chamber, the air from the latter would flow back into the air-cylinder—a condition manifestly undesirable. Again, in the operation of an air-compressing engine it is impossible to so design the air-cylinder that all the compressed air within the cylinder is discharged at the end of each stroke. Certain clearance-spaces within the cylinder are necessary, and these spaces contain the compressed air which it is impossible to discharge. As a consequence it is desirable that the air-inlet valves remain closed until, owing to the retreat of the air-cylinder piston, the compressed air referred to has expanded down to more nearly atmospheric pressure. If the air-inlet valve should open before this condition is reached, it is evident that this compressed air would flow out of the cylinder into the atmosphere.

The object of my invention is to provide valve-gears for both the air-inlet and air-outlet valves that will meet the above-outlined desirable requirements. I attain this object in the manner illustrated in the accompanying drawings, in which—

Figure 2:
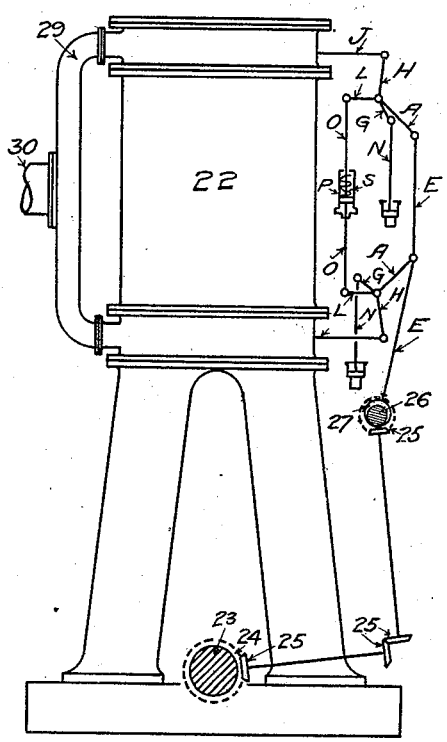
Figure 3:
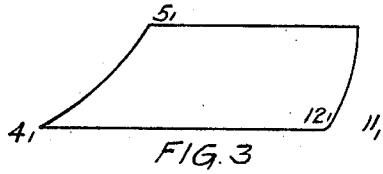
Figure 4:
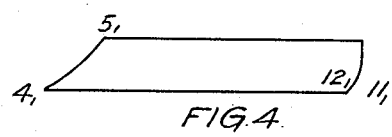
Figure 5:
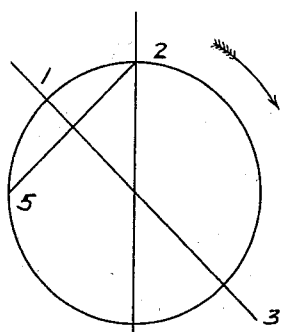
Figure 6:
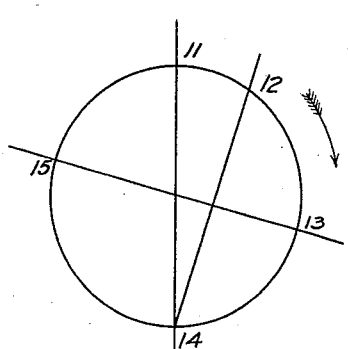
Figure 7:
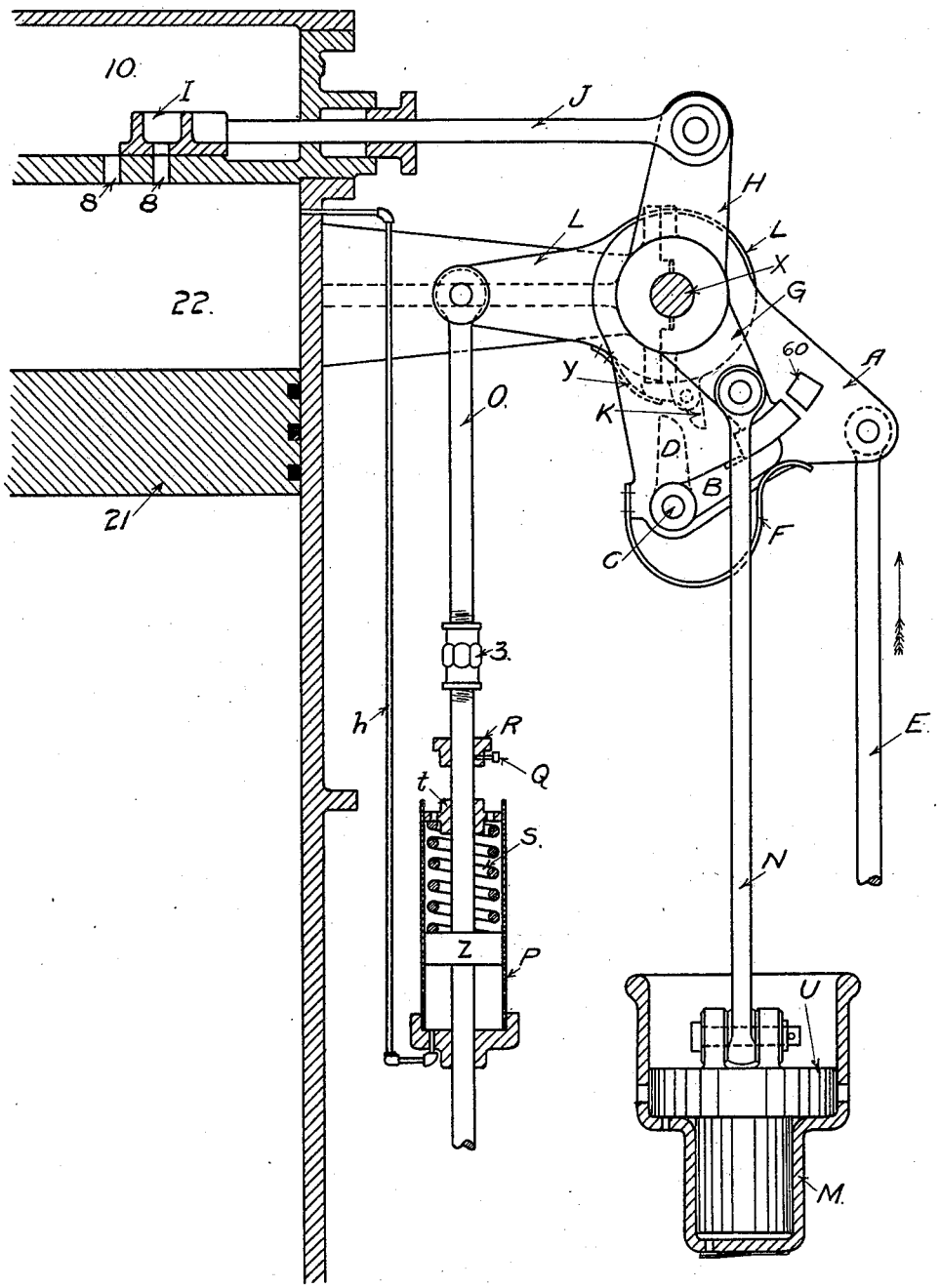
Figure 8:
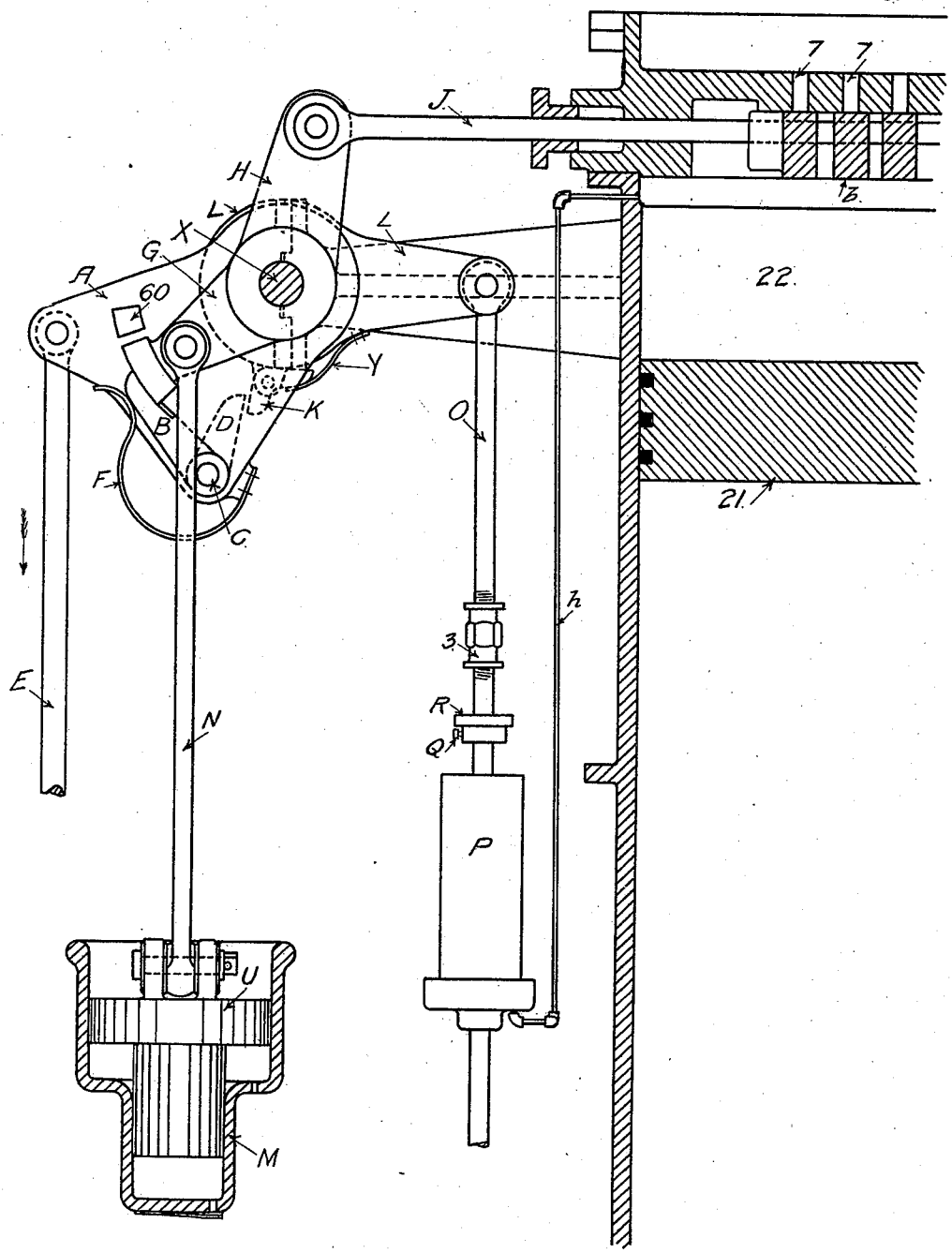
Figure 9:
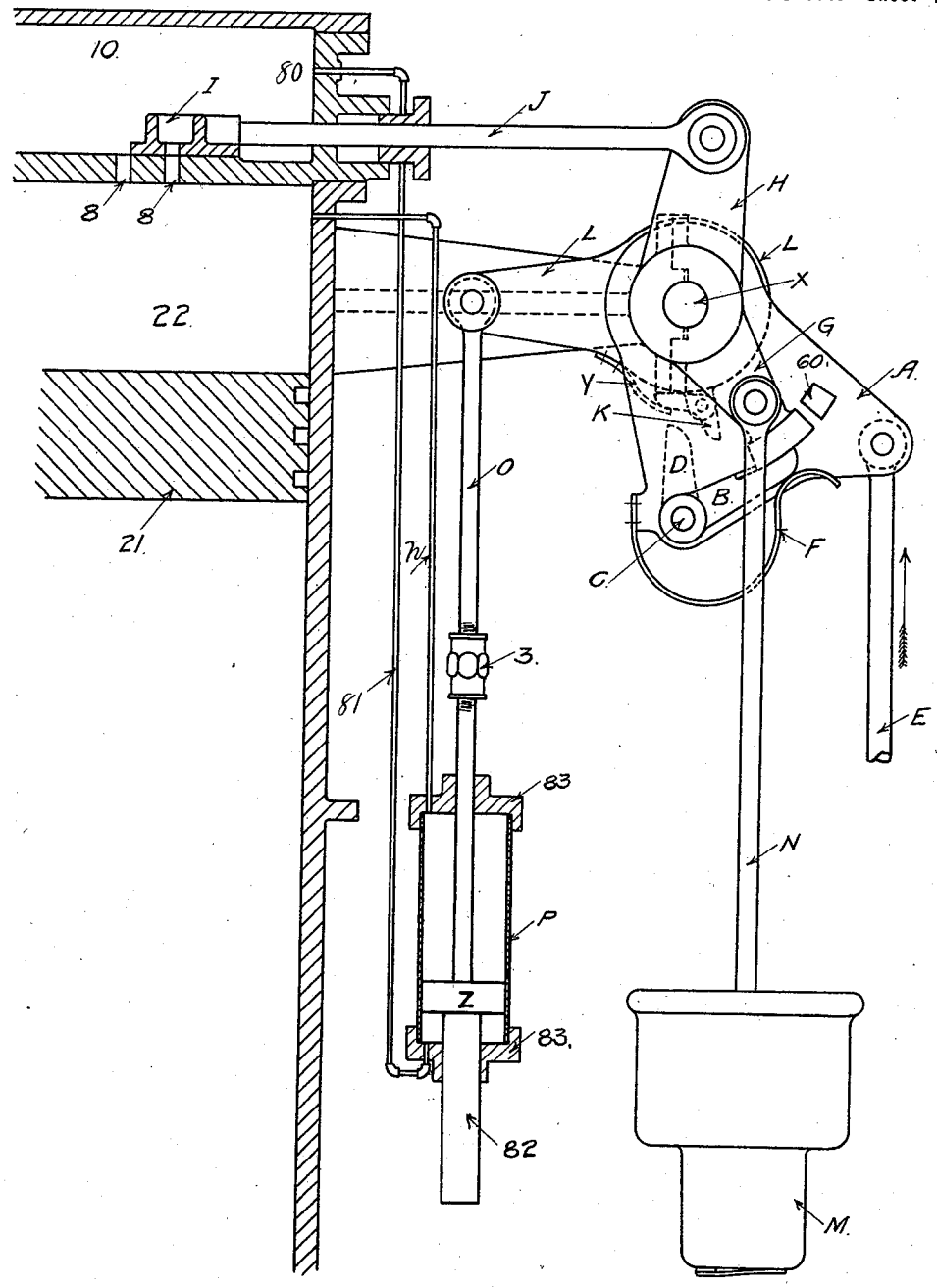

Figure 1 is a vertical elevation of a blowing-engine, showing the air-cylinder and one means of giving the necessary motion to the valve-operating levers. Fig. 2 is a vertical elevation of a blowing-engine similar to Fig. 1, except that it shows a different mechanism for imparting motion to the valve-operating levers. Figs. 3 and 4 are theoretical indicator-diagrams showing the pressure secured within the air-cylinders. Figs. 5 and 6 are diagrams illustrating the operation of the valve-gear. Figs. 7 and 8 show in detail the operating-gear for the air outlet and inlet valves, respectively. Fig. 9 is a view of a modification.

Similar characters refer to similar parts throughout the several views.

Referring to the drawings, 22 is the air-cylinder, and 21 the piston moving within the cylinder.

10 is the inclosed air space or chamber at the end of the air-cylinder, into which the compressed air is discharged and which connects with the air-receiver. The air to be compressed is admitted to the cylinder 22 through ports 7, controlled by valve *b*, (see Fig. 8,) and the air after being compressed is discharged into 10 through ports 8, controlled by valve I. (See Fig. 7.)

Referring particularly to Figs. 7 and 8, the shaft X has pivoted thereon levers A, G, L, and H. Levers G and H are connected together and in the drawings are shown on one hub. To A is attached rod E, actuated by any convenient method from main engine-shaft 23. (See Figs. 1 and 2.) A also carries shaft C, to which are connected pawls B and D. F is a spring that presses against pawl B. Lever H is connected to outlet-valve I (see Fig. 7) or inlet-valve *b* (see Fig. 8) by means of rod J, and lever G is connected to dash-pot piston U inside of dash-pot M by means of rod N. Lever L carries a trip K, against which presses spring Y. Rod O is connected at one end to lever L and at the other to piston Z, operating within what I term the "regulating-cylinder" P. S is a spring within P, pressing on Z and held by cap t. A turnbuckle 3 provides adjustment for rod O. A pipe h connects the space in the end of the cylinder 22 with cylinder P, as indicated. R is a stop sliding on rod O and capable of being held in any position on rod O by set-screw Q.

Referring to Fig. 7, the operation of the valve-gear is as follows: Fig. 7 shows the air-outlet valve open. Forward-and-backward motion is transmitted to lever A through rod E, which is actuated from the engine-shaft 23. (See Figs. 1 and 2.) In this explanation we will first assume the forward motion to A, as indicated by the arrow near E, Fig. 7. The movement of A on X carries pawl B in the same direction, and pawl B being engaged with the end of lever G motion is communicated to the latter. G being on the same hub as H, the outlet-valve I is moved in the direction necessary to close the ports 8 (see Fig. 7) until said ports are closed. The motion of lever G, operating through N, raises the piston U in dash-pot M and creates a partial vacuum in the latter. The pawl D moves with A and passes trip K, attached to L, the trip K adjusting itself to the passage of D and being returned to the position shown in Fig. 7 by the action of spring Y. As the revolution of the main shaft 23 (see Figs. 1 and 2) of the engine continues the motion of E and A is reversed, and the pawl D, coming in contact with the trip K, releases the pawl B from the end of lever G and the latter is returned to its original position by the action of the dash-pot piston U and the partial vacuum created in M, and in its operation moving valve I so as to open ports 8. Attention is called to the fact that when the motion of A is reversed it is the action of the piston U in dash-pot M that opens valve I, unless an accident happens to the dash-pot or connections, in which case the projecting stop 60, attached to A, strikes G and forces open the valve I.

It is evident from the foregoing that the important element in the above gear is the trip K. In order that the air which is being compressed in the cylinder 22 be discharged into the open space 10 or the receiver connected thereto at the time when the pressure in the cylinder 22 is equal to that in 10, it is necessary that trip K be capable of adjustment to suit any air-pressure that it may be desirable to maintain. To this end the pipe h, connected to cylinder 22 at 20, communicates the air-pressure in the cylinder 22 to the cylinder P under the piston Z. Accordingly as the air-pressure is more or less in the cylinder 22 the spring S is compressed more or less by said air-pressure, and as a consequence the position of piston Z varies accordingly as the air-pressure varies, and as a result the position of trip K is varied, according as said air-pressure varies, through the medium of lever L, to which trip K is attached, and rod O, connected to both lever L and piston Z. The initial pressure of the spring S may be varied by screwing cap t in or out, as may be desired. It is evident that the initial pressure of spring S may be adjusted so that trip K will be in position to open valve I when the pressure in cylinder 22 equals the pressure it is desired to maintain in 10.

The foregoing description of the operation of the air-outlet-valve gear shown in Fig. 7 applies to the operation of the air-inlet-valve gear shown in Fig. 8. Attention is drawn, however, to the fact that while Fig. 7 shows the air-outlet valve open and in a position to begin closing Fig. 8 shows the air-inlet valve closed, with the pawl D having passed trip K in the forward motion and almost in contact with trip K in its backward motion—in other words, just preceding the point of opening.

The air-pipe h from cylinder 22 is connected to the cylinder P of the air-inlet gear as well as cylinder P of the air-outlet gear. The reason for this lies in the fact that it is extremely desirable that the air-inlet valve be not opened until the compressed air left in the clearance-spaces of the cylinder 22 by the action of the engine be expanded down to more nearly atmospheric pressure by the movement of piston 21. If the air-inlet valve were opened prior to such a condition, compressed air would escape in the atmosphere and a loss of power result. As a consequence the point in the motion of piston 21 at which the air-inlet valve should open depends upon the pressure in cylinder 22, and as explained heretofore the position of the trip K being controlled from cylinder 22 by the medium of the cylinder P controls the point at which the air-inlet valve will open.

A further explanation of the operation of the valve-gear will be understood by reference to the diagrams shown in Figs. 5 and 6 in connection with Figs. 7 and 8.

Referring first to Fig. 5—i. e., the diagram of the outlet-air-valve gear—point-mark 1 shows the position of the valve when the valve-gear is in the position shown in Fig. 7. When the point 2 on Fig. 5 is reached, the valve I is closed and lever A continues to move in the same direction until point 3 in Fig. 5 is reached, the lap of the valve I being increased from 2 until point 3. At this point the motion is reversed and the valve I moved toward the opening-point by the action of the piston U and dash-pot M. When pawl D meets trip K, pawl B is released from lever G and the valve I opened through the action of the piston U and dash-pot M. The position where pawl D meets trip K can occur at any point between points 4 and 5 on Fig. 5 by varying the position of K. As already explained, the position of K is regulated by the pressure in cylinder 22 acting through pipe $h$ on piston Z in cylinder P. If the initial pressure of spring S is adjusted by the cap, so that the valve I will open at a particular maximum air-pressure in cylinder 22, then in case a lower pressure is carried in cylinder 22 the piston Z in P will occupy a lower position, and thus change such position of trip K to suit the lower pressure.

Referring now to Fig. 6 in connection with Fig. 8—i. e., the diagram of the air-inlet-valve gear—the operation is similar in all respects to that described for the outlet air-valve, except that the valve $b$, Fig. 8, will open between points 11 and 12 in Fig. 5, according to the position of trip K, Fig. 8. As already explained, the higher the pressure in cylinder 22 the later will the valve $b$ open, and, similarly, the lower the pressure the earlier will the valve open, the regulation being such that the valve $b$ opens when the air left in cylinder 22 at the end of each stroke has expanded to atmospheric pressure. Valve $b$ remains open until point 13 is reached, where it begins to close, and at point 14 is fully closed, continuing to increase its lap to point 15, where it begins to move toward the opening-point, which, as explained, may be at any point between 11 and 12, according to the pressure in cylinder 22.

Figs. 3 and 4 show the theoretical indicator-diagrams under two different conditions of compression—i. e., Fig. 3 is based upon the compression being twice as great as that in Fig. 4. As heretofore explained, the opening-point of the outlet-valve may occur at any point between 4 and 5, according to the pressure. Thus point 5, Fig. 3, shows the opening of the outlet-valve at a point twice as far from 4 as is the case in Fig. 4. Likewise, as explained, opening of the inlet-valve may occur at any point between 11 and 12, Fig. 6, according to the pressure in 10. Thus point 12, Fig. 3, shows the opening of the inlet-valve at a point as far from 11 as is the case in Fig. 4.

Under certain conditions (see Figs. 7 and 8) the valve-gear may be made to operate without the intervention of the pipe $h$, connecting cylinder 22 with the regulating-cylinder P. It is evident that the piston Z in P may be raised by hand from the bottom of the cylinder P and held in such position by moving down stop R and securing it to rod O by set-screw Q. In other words, in place of the air-pressure in cylinder 22 raising the piston Z and compressing the spring S and adjusting the position of trip K to suit the pressure in cylinder 22 the spring S may be arbitrarily compressed by raising Z, the latter being held in its position by stop R, the trip K in the meantime assuming a position to correspond with the position of Z or to a position corresponding with a pressure in cylinder 22 represented by the position of Z. As a consequence it is evident that the outlet-valve may be made to open at any arbitrary pressure without the intervention of the pipe $h$, communicating the pressure in cylinder 22 to P. It is also evident that the spring S in P may be omitted and the piston Z held in any arbitrary position without the pressure or resistance exerted by S.

Figs. 7 and 8 show only a portion of one of the cylinders 22, together with the valve-gear relating to that end. Ordinarily outlet and inlet valves are provided on both ends of an air-cylinder, and the valve-gear, &c., for the opposite end of the cylinder from that shown in the figures referred to may be made identical with that shown in the drawings. This is indicated by Figs. 1 and 2. Attention is called to the fact that only one regulating-cylinder P is required for operating the inlet-valves at both ends of the cylinder 22 and that only one regulating-cylinder P is required for operating the outlet-valves at both ends of the cylinder 22. Figs. 7 and 8 show the rod O continued through P to make connection to the valve-gear connected with the other end of the cylinder. Figs. 1 and 2 show the rod O connected to both sets of valve-gear. The spaces 10 at each end of the cylinder are usually joined by a pipe 29, to which is connected pipe 30, leading to the air-receiver. (See Figs. 1 and 2.)

The necessary motion to rod E may be secured in any approved manner. Figs. 1 and 2 show two methods. In Fig. 1 an eccentric 28 is provided on the main shaft 23 and its reciprocal motion communicated to E through the crank and rods indicated. In Fig. 2 a gear-wheel 24 is provided on the main shaft 23, and rotary motion communicated to a counter-shaft 26 by means of gear-wheels 24 and 25, together with the shafts to which they are attached. An eccentric 27 is attached to counter-shaft 26 and its reciprocal motion communicated to E, as indicated.

Another form of regulating-cylinder is shown in Fig. 9, valve I being in a position ready to begin closing, the arrangement of valve-gear being the same as that shown in Fig. 7. In Fig. 9, P is the regulating-cylinder, as before, containing piston Z, connected to valve-gear by rod O. Pipe $h$ connects cylinder 22, as before, to one end of the cylinder P on one side of piston Z, while pipe 81 connects the other end of the cylinder P to the chamber 10 through an opening 80. A rod 82, of larger diameter than the rod O, is connected to piston Z on the opposite side from rod O. Caps 83 close the ends of the cylinder. The operation of this form of apparatus is as follows: The pressure from chamber 10 is communicated to the side of piston Z having the lesser area, (by reason of rod 82 being larger than rod O.) Assuming that there is no pressure in cylinder 22, piston Z is forced upward and trip K moved to a position to correspond to the position of said piston. Assuming that the engine is started and the pressure in cylinder 22 gradually increases by the movement of piston 21, this increasing pressure is communicated to the side of piston Z having the larger area through pipe $h$. Now it is evident, owing to the difference in area of the two sides of piston Z, that as the pressure increases in the cylinder 22 a point will be reached where the piston Z is balanced—*i. e.*, has an equal pressure on both sides—and that, further, as this pressure in cylinder 22 increases the pressure in cylinder P becomes unbalanced until such point that the total pressure on the side of the piston to which rod O is connected becomes sufficiently greater than that on the side to which rod 82 is connected to overcome the friction of the valve-gear, when piston Z will be forced downwardly and trip K moved downwardly until it comes in contact with pawl D, when it will release pawl B from lever G, and the valve I opens as before by action of dash-pot M. The difference in diameters of rods O and 82 and consequent effective area of the two sides of the piston Z should be such that the valve I will open when the pressure in cylinder 22 equals or is slightly less than that in chamber 10. From the foregoing it is apparent that the arrangement of valve-gear shown in Fig. 9 differs from that shown in Fig. 7 and that the movement of the trip K, carried by lever L, releases pawl B from lever G in Fig. 9, while in Fig. 7 it is the movement of lever A, carrying pawl D, which releases pawl B from lever G by pawl D coming in contact with trip K.

It is evident that the arrangement shown in Fig. 9 can be modified by reversing the connections of pipes $h$ and 81 with the cylinder P, in which case the valve-gear would also be reversed, so that trip K would release pawl B from lever G in moving upwardly instead of when moving downwardly. It is also evident that rod 82 may be omitted and pipe 81 connected to the end of cylinder P having the larger effective area of piston and pipe $h$ connected to the end of cylinder P having the lesser effective area of piston. In such case the side of piston Z to which rod O is connected would have the lesser effective area by reason of the area of rod O. Various combinations may be made to secure this desired result.

I do not limit my invention to the application of the described devices to air-compressing engines. They may be applied to engines for compressing any other gas.

I do not limit my invention to the design of any part or parts shown in the drawings.

I do not limit my invention to the providing of a separate regulating-cylinder for the control of the operation of each valve. The regulating-cylinder may be used for the control of one or more valves, as may prove desirable or be preferred.

Having fully described my invention, what I claim, and desire to cover by Letters Patent, is—

1. In a gas-compressing engine, the combination of a gas-outlet valve or valves controlling communication between the inside of the compressing-cylinder and the chamber into which the compressed gas is discharged, a regulating-cylinder containing a piston, a pressure or resistance on one side of said piston, means for communicating the gas-pressure within the compressing-cylinder to the other side of the said piston, a trip controlling the point of opening of the gas-outlet valve or valves, and means whereby as the position of said piston in the regulating-cylinder varies the position of said trip is correspondingly varied.

2. In a gas-compressing engine, the combination of a gas-inlet valve or valves controlling communication between the inside of the compressing-cylinder and the source of the gas which is to be compressed, a regulating-cylinder containing a piston, a pressure or resistance on one side of said piston, means for communicating the gas-pressure within the compressing-cylinder to the other side of said piston, a trip controlling the point of opening of the gas-inlet valve or valves, and means whereby as the position of said piston in the regulating-cylinder varies the position of said trip is correspondingly varied.

3. In a gas-compressing engine, the combination of a gas-outlet valve or valves controlling the communication between the inside of the compressing-cylinder and the chamber into which the compressed gas is discharged, a regulating-cylinder containing a piston, a pressure or resistance on one side of said piston, means for varying said pressure or resistance at will, means for communicating the pressure within the compressing-cylinder to the other side of said piston, a trip controlling the point of opening of the gas-outlet valve or valves, and means whereby as the position of said piston in the regulating-cylinder varies the position of said trip is correspondingly varied.

4. In a gas-compressing engine, the combination of a gas-inlet valve or valves controlling communication between the inside of the compressing-cylinder and the source of the gas which is to be compressed, a regulating-cylinder containing a piston, a pressure or resistance on one side of said piston, means for varying said pressure or resistance, means for communicating the pressure within the compressing-cylinder to the other side of said piston, a trip controlling the point of opening of the gas-inlet valve or valves, and means whereby as the position of said piston in the regulating-cylinder varies the position of said trip is correspondingly varied.

In testimony whereof I have hereunto set my hand this 16th day of January, 1900.

AXEL H. HELANDER.

Witnesses:
L. K. LOCHMAN,
RANDOLPH H. MILLER.